(12) United States Patent
Musfeldt

(10) Patent No.: US 9,106,632 B2
(45) Date of Patent: Aug. 11, 2015

(54) PROVISIONING BY DELIVERED ITEMS

(75) Inventor: Roger Lynn Musfeldt, Omaha, NE (US)

(73) Assignee: FIRST DATA CORPORATION, Greenwood Village, CO (US)

( * ) Notice: Subject to any disclaimer, the term of this patent is extended or adjusted under 35 U.S.C. 154(b) by 0 days.

(21) Appl. No.: 13/481,352

(22) Filed: May 25, 2012

(65) Prior Publication Data

US 2012/0303496 A1 Nov. 29, 2012

Related U.S. Application Data

(60) Provisional application No. 61/490,501, filed on May 26, 2011.

(51) Int. Cl.
| | | |
|---|---|---|
| *G06Q 20/00* | (2012.01) |
| *H04L 29/06* | (2006.01) |
| *H04L 9/32* | (2006.01) |
| *H04W 12/02* | (2009.01) |
| *G06Q 40/00* | (2012.01) |
| *H04M 3/00* | (2006.01) |
| *G06F 21/00* | (2013.01) |
| *H04W 8/20* | (2009.01) |
| *H04W 4/00* | (2009.01) |

(52) U.S. Cl.
CPC ............... *H04L 63/08* (2013.01); *G06Q 40/00* (2013.01); *H04L 9/3234* (2013.01); *H04W 12/02* (2013.01); *G06Q 20/00* (2013.01); *H04L 63/061* (2013.01); *H04L 63/126* (2013.01); *H04L 2209/80* (2013.01); *H04L 2463/061* (2013.01); *H04L 2463/062* (2013.01); *H04W 4/001* (2013.01)

(58) Field of Classification Search
CPC . G06Q 20/32; G06Q 20/105; G07C 9/00087; H04L 67/025; H04L 67/125; H04L 9/3226; H04W 4/001; H04W 4/003; H04W 4/12; H04W 8/265; H04M 1/72525; H04M 2250/04; H04N 1/00973
See application file for complete search history.

(56) References Cited

U.S. PATENT DOCUMENTS

| | | | |
|---|---|---|---|
| 5,491,750 A | 2/1996 | Bellare et al. |
| 6,044,350 A | 3/2000 | Weiant, Jr. et al. |
| 6,084,969 A | 7/2000 | Wright et al. |
| 6,163,771 A | 12/2000 | Walker et al. |
| 6,422,462 B1 | 7/2002 | Cohen |
| 6,829,596 B1 * | 12/2004 | Frazee ........................... 705/66 |
| 6,931,382 B2 | 8/2005 | Laage et al. |

(Continued)

OTHER PUBLICATIONS http://www.mtfcu.org/Newsletter%202.htm See 'Tellers Tips' of attached pdf.*

(Continued)

*Primary Examiner* — Florian Zeender
*Assistant Examiner* — Dana Amsdell
(74) *Attorney, Agent, or Firm* — Sutherland Asbill & Brennan LLP

(57) ABSTRACT

Embodiments of the invention can provide systems and methods for device provisioning. According to one example embodiment of the invention, a method can be provided. The method can include identifying, from a computer-readable memory, provisioning information associated with a device; attaching the provisioning information to an item; and preparing the item to be sent to a location of the associated device, wherein the device is provisioned based at least in part on the item. In certain embodiments, one or more operations can be performed by one or more computers associated with a service provider.

20 Claims, 4 Drawing Sheets

(56) References Cited

U.S. PATENT DOCUMENTS

| | | | |
|---|---|---|---|
| 7,213,147 B2 | 5/2007 | Tuvell et al. | |
| 7,353,388 B1 | 4/2008 | Gilman et al. | |
| 7,548,621 B1 | 6/2009 | Smith et al. | |
| 7,702,553 B1 | 4/2010 | Dickelman | |
| 7,702,577 B1 | 4/2010 | Dickelman | |
| 7,751,810 B1* | 7/2010 | Bernoske et al. | 455/419 |
| 8,078,867 B2 | 12/2011 | Brown et al. | |
| 8,099,363 B1 | 1/2012 | Kilchenstein, Jr. | |
| 8,386,381 B1 | 2/2013 | Barton et al. | |
| 8,413,894 B2 | 4/2013 | Bona et al. | |
| 8,423,548 B1* | 4/2013 | Trandal et al. | 707/736 |
| 8,489,740 B2 | 7/2013 | Schneider | |
| 8,560,849 B2 | 10/2013 | Machani et al. | |
| 8,627,092 B2 | 1/2014 | Fischer et al. | |
| 8,689,012 B1 | 4/2014 | Bierbaum et al. | |
| 8,752,127 B2 | 6/2014 | Musfeldt et al. | |
| 8,775,305 B2 | 7/2014 | Pointer | |
| 8,880,886 B2 | 11/2014 | Kean et al. | |
| 2001/0029485 A1 | 10/2001 | Brody et al. | |
| 2002/0091646 A1 | 7/2002 | Lake et al. | |
| 2002/0128977 A1 | 9/2002 | Nambiar et al. | |
| 2002/0133467 A1 | 9/2002 | Hobson et al. | |
| 2002/0147658 A1 | 10/2002 | Kwan | |
| 2002/0156689 A1 | 10/2002 | Spalding | |
| 2003/0014360 A1 | 1/2003 | Arditti et al. | |
| 2003/0023549 A1 | 1/2003 | Armes et al. | |
| 2004/0030659 A1 | 2/2004 | Gueh | |
| 2004/0031856 A1 | 2/2004 | Atsmon et al. | |
| 2004/0123102 A1 | 6/2004 | Gehrmann et al. | |
| 2004/0155101 A1 | 8/2004 | Royer et al. | |
| 2004/0159700 A1 | 8/2004 | Khan et al. | |
| 2004/0172340 A1 | 9/2004 | Bishop et al. | |
| 2004/0242209 A1* | 12/2004 | Kruis et al. | 455/414.1 |
| 2005/0092839 A1* | 5/2005 | Oram | 235/462.13 |
| 2005/0182855 A1 | 8/2005 | Apostolopoulos et al. | |
| 2005/0198506 A1 | 9/2005 | Qi et al. | |
| 2005/0221814 A1 | 10/2005 | Fagan et al. | |
| 2005/0250538 A1 | 11/2005 | Narasimhan et al. | |
| 2005/0269402 A1 | 12/2005 | Spitzer et al. | |
| 2005/0279827 A1 | 12/2005 | Mascavage et al. | |
| 2006/0000900 A1 | 1/2006 | Fernandes et al. | |
| 2006/0040642 A1 | 2/2006 | Boris et al. | |
| 2006/0064458 A1 | 3/2006 | Gehrmann | |
| 2006/0077034 A1 | 4/2006 | Hillier | |
| 2006/0107335 A1* | 5/2006 | Frank et al. | 726/27 |
| 2006/0131410 A1 | 6/2006 | Fernandes et al. | |
| 2006/0169768 A1* | 8/2006 | Gangi | 235/380 |
| 2006/0179305 A1 | 8/2006 | Zhang | |
| 2006/0206350 A1 | 9/2006 | Edwards et al. | |
| 2007/0063024 A1 | 3/2007 | Guillot | |
| 2007/0088952 A1* | 4/2007 | Hewitt et al. | 713/171 |
| 2007/0091843 A1 | 4/2007 | Patel et al. | |
| 2007/0180262 A1* | 8/2007 | Benson | 713/186 |
| 2007/0203732 A1 | 8/2007 | Griegel et al. | |
| 2008/0006685 A1* | 1/2008 | Rackley, III et al. | 235/379 |
| 2008/0010217 A1 | 1/2008 | Hobson et al. | |
| 2008/0037785 A1 | 2/2008 | Gantman et al. | |
| 2008/0049940 A1 | 2/2008 | Kocher | |
| 2008/0052183 A1 | 2/2008 | Hobson et al. | |
| 2008/0126252 A1 | 5/2008 | Katz | |
| 2008/0130902 A1 | 6/2008 | Foo Kune et al. | |
| 2008/0136592 A1* | 6/2008 | Malik et al. | 340/10.1 |
| 2008/0141031 A1 | 6/2008 | Oba et al. | |
| 2008/0162929 A1 | 7/2008 | Ishikawa et al. | |
| 2008/0257952 A1 | 10/2008 | Zandonadi | |
| 2008/0288404 A1 | 11/2008 | Pirzadeh et al. | |
| 2008/0303665 A1* | 12/2008 | Naik et al. | 340/568.1 |
| 2008/0305772 A1 | 12/2008 | Balasubramanian et al. | |
| 2009/0006262 A1 | 1/2009 | Brown et al. | |
| 2009/0068988 A1 | 3/2009 | Cofta | |
| 2009/0074189 A1 | 3/2009 | Ryu et al. | |
| 2009/0099961 A1 | 4/2009 | Ogilvy | |
| 2009/0108064 A1 | 4/2009 | Fernandes et al. | |
| 2009/0132424 A1 | 5/2009 | Kendrick et al. | |
| 2009/0134217 A1 | 5/2009 | Flitcroft et al. | |
| 2009/0157557 A1 | 6/2009 | Hobson et al. | |
| 2009/0164774 A1 | 6/2009 | Sherkin | |
| 2009/0173784 A1 | 7/2009 | Yang | |
| 2009/0181644 A1* | 7/2009 | Humphrey et al. | 455/411 |
| 2009/0235065 A1 | 9/2009 | Nilsson et al. | |
| 2009/0248581 A1 | 10/2009 | Brown | |
| 2009/0307482 A1 | 12/2009 | McCann | |
| 2010/0005307 A1 | 1/2010 | Prashanth | |
| 2010/0106967 A1 | 4/2010 | Johansson et al. | |
| 2010/0111306 A1 | 5/2010 | Zheng et al. | |
| 2010/0116881 A1* | 5/2010 | Flood et al. | 235/380 |
| 2010/0161778 A1* | 6/2010 | Guinard et al. | 709/222 |
| 2010/0174649 A1 | 7/2010 | Bouchard | |
| 2010/0191966 A1 | 7/2010 | Immonen | |
| 2010/0192220 A1 | 7/2010 | Heizmann et al. | |
| 2010/0241847 A1 | 9/2010 | van der Horst et al. | |
| 2010/0257360 A1 | 10/2010 | Bae et al. | |
| 2010/0274691 A1 | 10/2010 | Hammad et al. | |
| 2010/0280950 A1 | 11/2010 | Faith et al. | |
| 2010/0293094 A1 | 11/2010 | Kolkowitz et al. | |
| 2011/0004653 A1* | 1/2011 | Cavill et al. | 709/203 |
| 2011/0010538 A1 | 1/2011 | Falk et al. | |
| 2011/0047072 A1 | 2/2011 | Ciurea | |
| 2011/0047075 A1 | 2/2011 | Fourez | |
| 2011/0087547 A1 | 4/2011 | Amaro et al. | |
| 2011/0087596 A1 | 4/2011 | Dorsey | |
| 2011/0101109 A1 | 5/2011 | Bona et al. | |
| 2011/0137802 A1 | 6/2011 | Spies et al. | |
| 2011/0154021 A1 | 6/2011 | McCann et al. | |
| 2011/0208965 A1 | 8/2011 | Machani | |
| 2011/0231270 A1 | 9/2011 | Dykes et al. | |
| 2011/0231319 A1 | 9/2011 | Bayod et al. | |
| 2011/0238575 A1 | 9/2011 | Nightengale et al. | |
| 2011/0264567 A1 | 10/2011 | Clyne | |
| 2011/0282789 A1 | 11/2011 | Carroll et al. | |
| 2011/0288918 A1 | 11/2011 | Cervenka et al. | |
| 2011/0309309 A1 | 12/2011 | Hartmann et al. | |
| 2011/0314274 A1 | 12/2011 | Swartz | |
| 2012/0017089 A1 | 1/2012 | Kocher | |
| 2012/0022945 A1 | 1/2012 | Falkenborg et al. | |
| 2012/0023022 A1 | 1/2012 | Carroll et al. | |
| 2012/0095857 A1 | 4/2012 | McKelvey et al. | |
| 2012/0097739 A1 | 4/2012 | Babu et al. | |
| 2012/0108295 A1* | 5/2012 | Schell et al. | 455/558 |
| 2012/0109734 A1 | 5/2012 | Fordyce, III et al. | |
| 2012/0130898 A1 | 5/2012 | Snyder et al. | |
| 2012/0159105 A1 | 6/2012 | von Behren et al. | |
| 2012/0172089 A1 | 7/2012 | Bae et al. | |
| 2012/0174189 A1 | 7/2012 | Lim et al. | |
| 2012/0190386 A1* | 7/2012 | Anderson | 455/456.3 |
| 2012/0197802 A1 | 8/2012 | Smith et al. | |
| 2012/0203698 A1 | 8/2012 | Duncan et al. | |
| 2012/0215610 A1 | 8/2012 | Amaro et al. | |
| 2012/0239479 A1 | 9/2012 | Amaro et al. | |
| 2012/0239574 A1 | 9/2012 | Smith et al. | |
| 2012/0296741 A1 | 11/2012 | Dykes | |
| 2012/0296824 A1 | 11/2012 | Rosano | |
| 2012/0300932 A1 | 11/2012 | Cambridge et al. | |
| 2012/0300938 A1 | 11/2012 | Kean et al. | |
| 2012/0303310 A1 | 11/2012 | Musfeldt | |
| 2012/0303503 A1 | 11/2012 | Cambridge et al. | |
| 2012/0303961 A1 | 11/2012 | Kean et al. | |
| 2012/0304254 A1 | 11/2012 | Musfeldt et al. | |
| 2012/0304255 A1 | 11/2012 | Carnes | |
| 2012/0317019 A1 | 12/2012 | Carnes | |
| 2013/0179695 A1 | 7/2013 | Zollinger et al. | |
| 2013/0303142 A1* | 11/2013 | Burcham et al. | 455/418 |
| 2014/0237551 A1 | 8/2014 | Musfeldt et al. | |

OTHER PUBLICATIONS

Final Office Action response for U.S. Appl. No. 13/481,387 mailed Jun. 25, 2014.

Non-final Office Action response for U.S. Appl. No. 13/481,394 mailed Aug. 15, 2014.

Non-final Office Action response for U.S. Appl. No. 13/481,364 mailed Sep. 4, 2014.

Advisory Action for U.S. Appl. No. 13/481,387 mailed Sep. 4, 2014.

(56) References Cited

OTHER PUBLICATIONS

Advisory Action response for U.S. Appl. No. 13/481,387 mailed Sep. 25, 2014.
Non-final Office Action response for U.S. Appl. No. 13/481,356 mailed Sep. 29, 2014.
Final Office Action for U.S. Appl. No. 13/481,364 mailed Nov. 24, 2014.
Non-final Office Action for U.S. Appl. No. 13/481,346 mailed Dec. 4, 2014.
Final Office Action for U.S. Appl. No. 13/481,356 mailed Dec. 12, 2014.
Non-final Office Action for U.S. Appl. No. 13/481,437 mailed Sep. 9, 2013.
Non-final Office Action for U.S. Appl. No. 13/481,377 mailed Oct. 10, 2013.
Non-final Office Action for U.S. Appl. No. 13/481,433 mailed Oct. 23, 2013.
Notice of Allowance for U.S. Appl. No. 13/481,437 mailed Dec. 26, 2013.
Notice of Allowance for U.S. Appl. No. 13/481,377 mailed Jan. 28, 2014.
Non-final Office Action for U.S. Appl. No. 13/481,387 mailed Feb. 6, 2014.
Final Office Action for U.S. Appl. No. 13/481,433 mailed Apr. 10, 2014.
Non-final Office Action for U.S. Appl. No. 13/481,394 mailed May 21, 2014.
Non-final Office Action for U.S. Appl. No. 13/481,364 mailed Jun. 4, 2014.
Final Office Action for U.S. Appl. No. 13/481,387 mailed Jun. 25, 2014.
Non-final Office Action for U.S. Appl. No. 13/481,356 mailed Jun. 27, 2014.
Notice of Allowance for U.S. Appl. No. 13/481,433 mailed Jun. 30, 2014.
Non-final Office Action response for U.S. Appl. No. 13/481,437 mailed Nov. 20, 2013.
Non-final Office Action response for U.S. Appl. No. 13/481,377 mailed Jan. 10, 2014.
Non-final Office Action response for U.S. Appl. No. 13/481,433 mailed Jan. 23, 2014.
Non-final Office Action response for U.S. Appl. No. 13/481,387 mailed Apr. 21, 2014.
Final Office Action response for U.S. Appl. No. 13/481,433 mailed Jun. 10, 2014.

* cited by examiner

PROVISIONING BY DELIVERED ITEMS

RELATED APPLICATION

This application claims priority to U.S. Ser. No. 61/490,501, titled "Trusted Service Manager," filed on May 26, 2011, the contents of which are incorporated herein by reference.

FIELD OF THE INVENTION

Embodiments of the invention relate generally to device provisioning, and additionally to device provisioning from delivered items.

BACKGROUND OF THE INVENTION

Mobile devices, such as cell phones, personal digital assistants (PDAs), smart phones, and other similar devices, have increasingly been utilized to provide voice communications as well as additional functionality. With the ever expanding network of cellular and other communications means, and the rapidly growing volume of additional mobile device functionalities, the importance and popularity of mobile devices has likely never been greater. One component of enabling mobile devices to be utilized for their purposes includes device provisioning. Device provisioning involves "registering" mobile devices and/or applications stored thereon with respective service and/or application providers. However, most mobile devices are not pre-provisioned, out of the box, and may involve over-the-air and/or manual provisioning, such as by at a retail dealer at a retail store, or the like. Additionally, to add functionality to a mobile device, an application will usually be provisioned prior to being implemented. Accordingly, improved systems and methods for provisioning mobile devices and related mobile applications are desirable.

BRIEF DESCRIPTION OF THE INVENTION

Embodiments of the invention may provide systems and methods for device provisioning. According to one example embodiment of the invention, a method can be provided. The method can include identifying, from a computer-readable memory, provisioning information associated with a device; attaching the provisioning information to an item; and preparing the item to be sent to a location of the associated device, wherein the device is provisioned based at least in part on the item. In certain embodiments, one or more operations can be performed by one or more computers associated with a service provider.

According to another embodiment, a system for providing tokens to devices can be provided. The system may include at least one memory and at least one processor. The at least one memory may be configured to store computer-executable instructions. The at least one processor may be configured to identify, from a computer-readable memory, provisioning information associated with a device; attach the provisioning information to an item; and prepare the item to be sent to a location of the associated device, wherein the device is provisioned based at least in part on the item. In certain embodiments, one or more operations can be performed by one or more computers associated with a service provider.

According to yet another embodiment, a method can be provided. The method can include storing, in one or more memories, an application for processing one or more provisioning triggers; receiving, from an item provider, an item that contains a provisioning trigger; processing the provisioning trigger with the application; and provisioning a device or an application based at least in part on the provisioning trigger.

In certain embodiments, one or more operations can be performed by one or more computers associated with a service provider.

According to another embodiment, a system for providing tokens to devices can be provided. The system may include at least one memory and at least one processor. The at least one memory may be configured to store computer-executable instructions. The at least one processor may be configured to store, in one or more memories, an application for processing one or more provisioning triggers; receive, from an item provider, an item that contains a provisioning trigger; process the provisioning trigger with the application; and provision a device or an application based at least in part on the provisioning trigger. In certain embodiments, one or more operations can be performed by one or more computers associated with a service provider.

Additional systems, methods, apparatus, features, and aspects are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
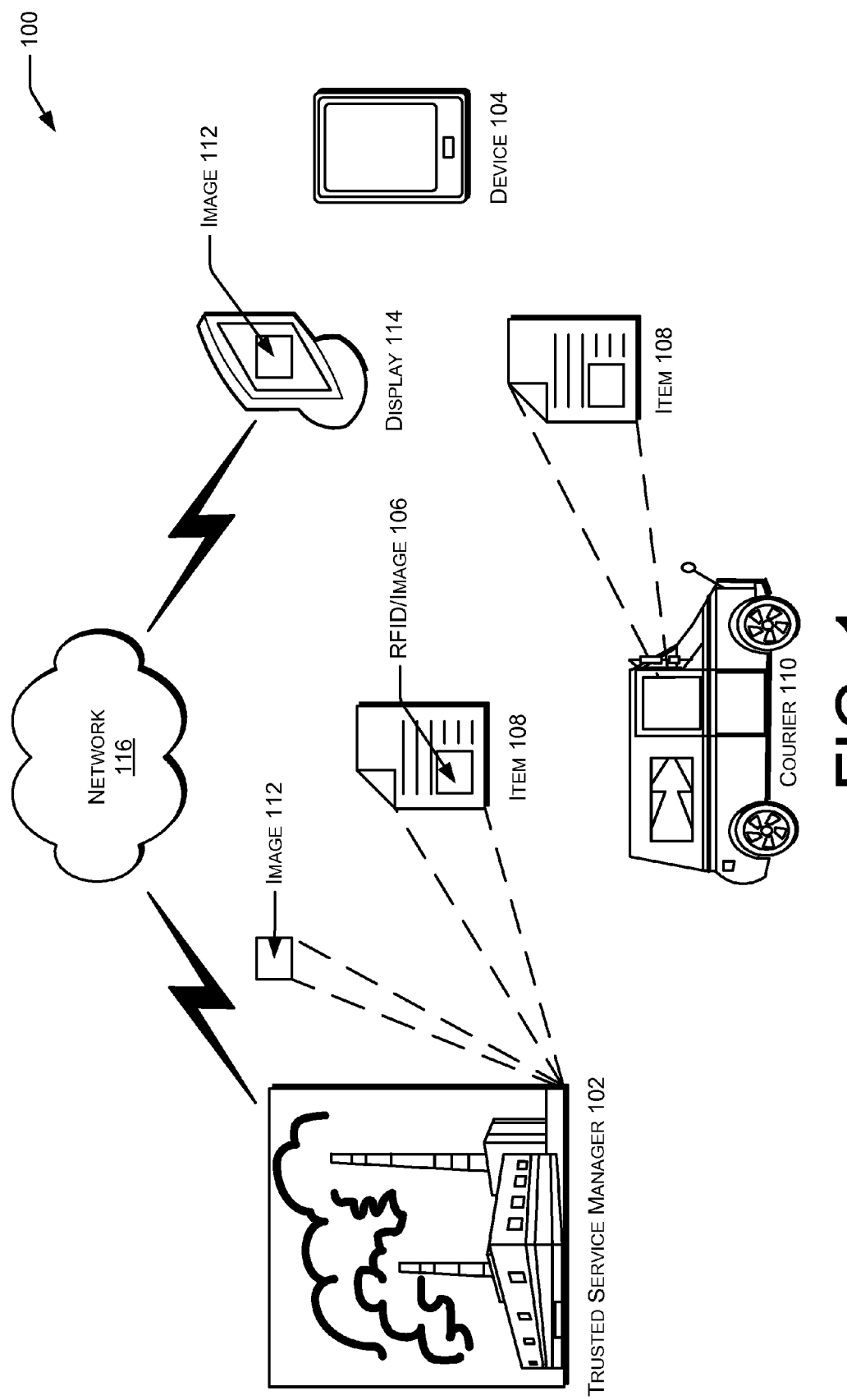
FIG. 1 illustrates a block diagram of an example device provisioning implemented via item delivery, according to an example embodiment of the invention.

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements.

This disclosure describes, among other things, provisioning by delivered items. In particular, systems and methods are presented for provisioning mobile devices and/or mobile applications by delivering items, such as documents, that may contain provisioning information and/or information (e.g., links, etc.) that may be utilized to obtain provisioning information. In certain embodiments of the invention, a mobile Near Field Communication (NFC) device may include one or more secure elements (e.g., a smart card chip) and/or shared memories for housing multiple applications issued to the device by one or more issuers.

A wide variety of applications may perform a wide variety of actions from the secure elements. Examples of suitable actions include, but are not limited to, loading and/or installing new applications, personalizing applications with consumer data (e.g., credit card information), locking and/or unlocking applications, terminating applications, and/or deleting applications. Additionally, provisioning may be implemented to "register" the mobile device with a service provider or to "register" an application of the mobile device. In certain embodiments of the invention, applications may be loaded and/or installed and personalized using an over-the-air (OTA) provisioning process. Further, the trigger to start the provisioning process can come from a wide variety of sources. Example triggering sources include, but are not limited to, a consumer entering information via a mobile wallet or an issuer, such as a trusted service manager (TSM), triggering messages to the mobile device from a host computing system.

In certain embodiments, triggering provisioning between a mobile device or application and a TSM may include sending a radio-frequency identification (RFID) tag, bar code, or other image to a mobile device. The mobile device may receive, read, capture, or otherwise process the RFID tag, bar code, or image information in order to begin the provisioning process. In some aspects, a mobile device may receive a signal from an RFID tag that is stamped, embedded, or otherwise attached to a paper statement, bill, or letter. The statement, bill, or letter may be mailed to a location associated with the mobile device or presented to a user of the mobile device at a retail store or other location. In this way, a user may accept an offer to provision and effectuate the provisioning of a mobile device or application (e.g., a secure payment application for shopping) while at a retailer or at home. Further, in some embodiments, triggering the provisioning may include sending a bar code or image to the mobile device. The bar code or image may be printed on a statement, bill, or other paper document or it may be transmitted to a display device over a network. As such, the mobile device may be triggered to provision itself or an application by capturing the bar code or image with a camera or other image capture device.

Applications that can be provisioned on mobile devices via a TSM can be any software application provided by a service provider and operable with a mobile device. According to one embodiment, near field communication (NFC) applications that enable subsequent transactions using NFC technology of the mobile device (e.g., RFID) are among those mobile device applications provided by service providers. However, as used herein, mobile device applications are not limited to NFC-based applications. Example mobile device applications may include, but are not limited to, open loop and closed loop payment applications (e.g., MasterCard® PayPass™, Visa payWave™, American Express® ExpressPay, Discover® ZIP, NXP Mifare®, etc.), transit payment applications, loyalty applications, membership applications, electronic promotion and incentive applications, ticketing applications, access control and security applications, entertainment applications, retail shopping applications, and the like.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 represents an illustrative block diagram illustrating a high-level overview of a device and/or application provisioning by delivered items architecture 100. The architecture 100 includes a TSM or other provisioning information issuer 102 which may be a data center, a stand-alone device manufacturer, an application publisher or issuer, or any other entity for effectuating architecture 100. In certain aspects, a mobile device 104, or an application of a mobile device 104, may be provisioned to register or initialize with the TSM 102 based on a triggering event. For example, a signal or other trigger may be transmitted, or otherwise sent, to the mobile device 104 to begin a provisioning process with the TSM 102 or other entity.

In certain embodiments, a TSM 102 may receive, identify, or create such triggering information. For example, the TSM 102 may receive, provide, or manufacture an RFID tag 106 that contains data for triggering the provisioning of device 104. The RFID tag 106 may be embedded, printed, or otherwise attached onto an item 108 such as a statement, a bill, an advertisement, or other document. Further, in certain embodiments of the invention, the item 108 may be sent to a location associated with the device 104. In some examples, sending the item 108 with the RFID tag 106 may include mailing the item 108 via a courier 110, such as but not limited to the U.S. Postal Service®, United Parcel Service®, Fedex®, or the like. Alternatively, or in addition, sending the item 108 with the RFID tag 106 may include presenting a user of the device 104 with a statement, such as at a retail store or other location where the user may wish to provision the device or application.

In one non-limiting example, a user may be at a retail store and may wish to pay for an item using their cellular phone, such as mobile device 104. In this example, a clerk or employee of the retail store may be able to provide an item 108 that contains an RFID tag 106 to trigger provisioning (i.e., installing and registering) a mobile application for mobile payment. In another non-limiting example, a user may receive a new mobile device in the mail and an associated item 108 that contains an RFID tag 106 for provisioning the device. Either way, the RFID tag 106 transmits data to the mobile device 104 that triggers the device 104 to communicate with the TSM 102 or other entity to handle the provisioning process.

Alternatively, in certain aspects of the invention, a bar code or other image 112 may be used to trigger the provisioning. The bar code or image 112 may be printed on a document, such as item 108 and mailed, such as via courier 110, or it may be sent to a display device 114 via a wired or wireless network 116. In certain aspects, the bar code or image 112 may be displayed on the display device 114 at a location where it may be received by the device 104. For example, an image capture device of the mobile device 104 may capture and process the bar code or image 112 displayed on the display device 114. The captured image may enable triggering of the provisioning. Further, in certain aspects, the network 116 may resemble any of the networks described above with reference to the Systems and Methods for Encrypting Mobile Device Communications Section.

In certain embodiments, the device 104 may utilize an application for processing received triggering information and/or effectuating triggering of the provisioning. That is, the device 104 may have a limited-purpose application stored in memory that when executed is configured to trigger provisioning based on the received information. For example, data received from an RFID tag 106 may be processed by the application of the device 104 such that the device may begin provisioning based on the data. Similarly, the application may receive a captured image of a bar code or other image, determine provisioning information from the bar code or image, and trigger provisioning on this information.

Figure 2:
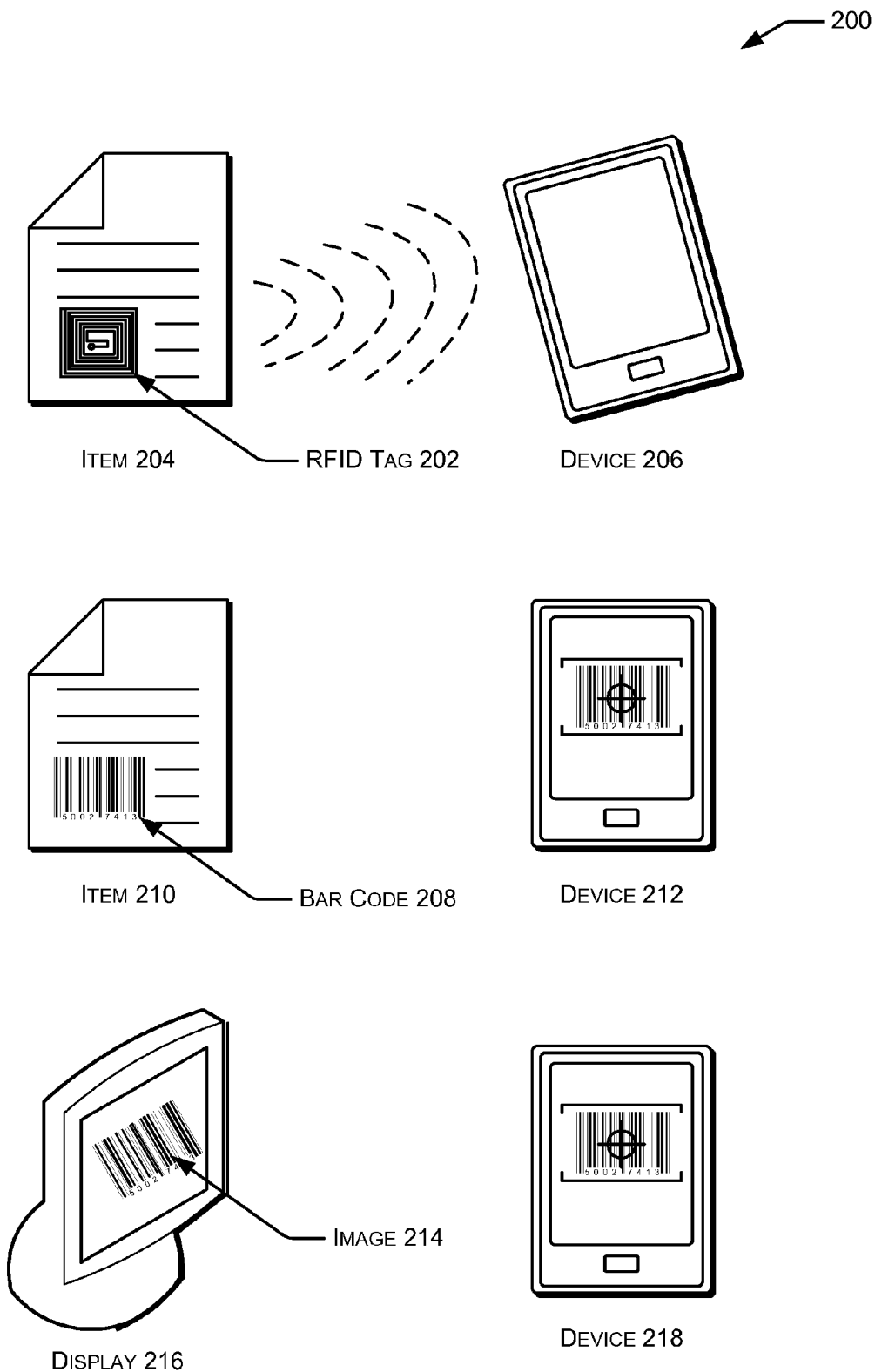
FIG. 2 illustrates a block diagram of several example device provisioning scenarios, according to an example embodiment of the invention.

FIG. 2 represents an illustrative block diagram illustrating several example embodiments 200 for provisioning devices and/or applications by delivered items. The example embodiments 200 include at least four scenarios; however, other scenarios are possible. In certain embodiments, an RFID tag 202 may be attached or otherwise embedded into an item 204. A device 206 may be triggered to provision itself or an application by tapping, bumping, or otherwise coming in contact with the RFID tag 202. In this example, the contact may trigger the RFID tag 202 to transmit data to the device 206. The transmitted data may trigger the device or application to begin provisioning with a TSM or other computing device. Alternatively, or in addition, the device 206 may be configured to be in a reader emulation mode where it can periodically, or perpetually, read RFID tags. Once the data contained in the RFID tag 202 is received by the device 206, an application may be provisioned to the NFC secure element of the device 206.

In certain other embodiments, a bar code 208, or other image, may be printed or otherwise attached to an item 210. When the item 210 is within a certain distance of a device 212, the device 212 may capture and/or process the image via its camera or other image capture apparatus. Similar to the RFID tag example above, the data in the bar code 208 may trigger the provisioning. In this scenario, the item 210 may be a paper bill, statement, or other document mailed or presented to a user of the device 212. However, in other scenarios, an image 214, or bar code, may be displayed on a display device 216. Similarly, a device 218 may capture and/or process the image 214 such that the image 214 triggers the device 218 to begin provisioning.

FIGS. 1 and 2 provide simplified examples of suitable provisioning by delivered items. However, other configurations are also possible. For example, while the devices 104, 206, 212, and 281 are shown as mobile devices, the embodiments described above could also be used to provision non-mobile devices and/or applications of non-mobile devices. Further, while a courier service 110 is shown for delivering items, other deliver options are also possible. For example, items containing RFID tags, bar codes, or images may be printed, manufactured, or programmed at any location and delivered to locations associated with devices (or users of devices) by any manner, or combinations thereof.

Figure 3:
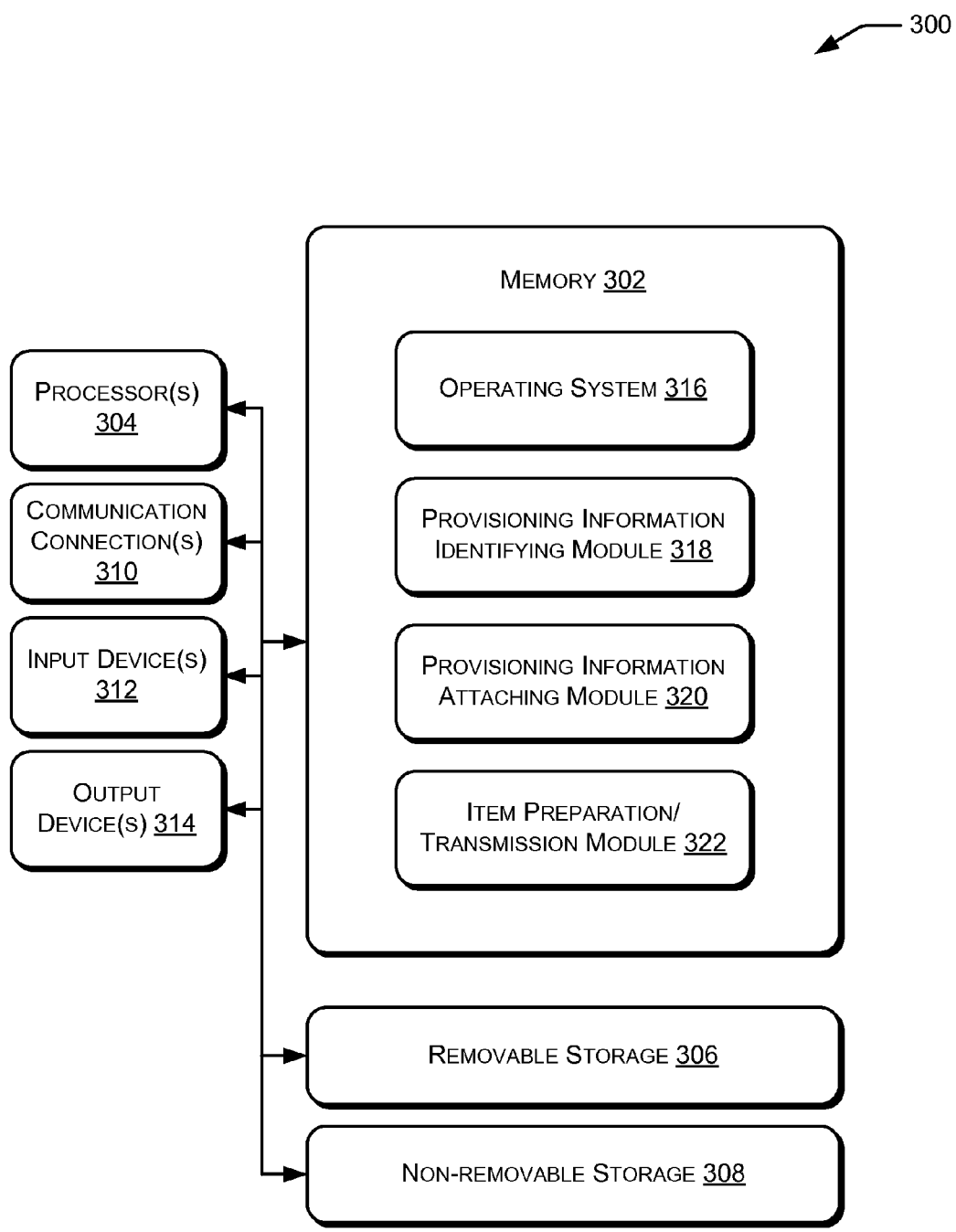
FIG. 3 illustrates a block diagram of an example computing device for implementing provisioning by delivered items, according to an example embodiment of the invention.

FIG. 3 provides an illustrative overview of one computing environment 300, in which aspects of the invention may be implemented. The computing environment 300 may be configured as any suitable computing device capable of implementing provisioning by delivered items. By way of example and not limitation, suitable computing devices may include personal computers (PCs), servers, server farms, datacenters, or any other device capable of storing and executing all or part of the invention.

In one illustrative configuration, the computing environment 300 comprises one or more memories 302 and one or more processing units (or processor(s)) 304. The processor 304 may be implemented as appropriate in hardware, software, firmware, or combinations thereof. Software or firmware implementations of the processor 304 may include computer-executable or machine-executable instructions written in any suitable programming language to perform the various functions described.

Memory 302 may store program instructions that are loadable and executable on the processor 304, as well as data generated during the execution of these programs. Depending on the configuration and type of computing device, memory 302 may be volatile (such as random access memory (RAM)) and/or non-volatile (such as read-only memory (ROM), flash memory, etc.). The computing device or server may also include additional removable storage 306 and/or non-removable storage 308 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 302 may include multiple different types of memory, such as static random access memory (SRAM), dynamic random access memory (DRAM), or ROM.

Memory 302, removable storage 306, and non-removable storage 308 are all examples of computer-readable storage media. Computer-readable storage media includes, but is not limited to, volatile and non-volatile, removable and non-removable media implemented in any method or technology for storage of information such as computer-readable instructions, data structures, program modules or other data. Memory 302, removable storage 306, and non-removable storage 308 are all examples of computer storage media. Additional types of computer storage media that may be present include, but are not limited to, phase change memory (PRAM), SRAM, DRAM, other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server or other computing device. Combinations of any of the above should also be included within the scope of computer-readable storage media.

The computing environment 300 may also contain communications connection(s) 310 that allow the computing environment 300 to communicate with a stored database, another computing device or server, user terminals, and/or other devices on a network, such as devices 102, 206, 212, and/or 218 of FIGS. 1 and 2.

The computing environment 300 may also include input device(s) 312 such as a keyboard, mouse, pen, voice input device, touch input device, etc., and output device(s) 314, such as a display, speakers, printer, etc.

Turning to the contents of the memory 302 in more detail, the memory 302 may include an operating system 316 and one or more application programs or services for implementing the provisioning by delivered items architecture 100.

The memory 302 may further include a provisioning information identifying module 318. The provisioning information identifying module 318 may include, but is not limited to, logic configured to identify provisioning information for use with mobile devices, such as device 104, and/or application of mobile devices. That is, a TSM or other application issuer (e.g., a financial institution, merchant, service provider, etc.) may have the provisioning information stored in memory, it may create the provisioning information, or it may receive the provisioning information from another computing device or issuer. In other words, the provisioning information identifying module 318 may identify provisioning information by reading from memory, creating the information, or receiving the information from a third party.

The memory 302 may further include a provisioning information attaching module 320. The provisioning information attaching module 320 may include, but is not limited to, logic configured to attach provisioning information to items. That is, a TSM or other application issuer may attach the provisioning information to an item by creating or programming an RFID tag and/or embedding (or otherwise attaching) the RFID tag to the item. Additionally, in certain aspects, attaching the information may include printing a bar code or image to a physical document and/or appending a data to a digital document.

The memory 302 may also include an item preparation/transmission module 322. The item preparation/transmission module 322 may include, but is not limited to, logic configured to prepare items, such as statements, bills, or the like and to transmit. That is, a TSM or other application issuer may attach the provisioning information to an item by creating or programming an RFID tag and/or embedding (or otherwise attaching) the RFID tag to the item. Additionally, in certain aspects, attaching the information may include printing a bar code or image to a physical document and/or appending a data to a digital document. Further, the item preparation/transmission module 322 may also transmit the item to a location associated with the device. For example, the item preparation/transmission module 322 may be configured to transmit the item over a network to a display device or may be configured to mail the item or provide the item to an entity for mailing the item. For example, the item may be transmitted over the Internet, satellite network, or cable network for display.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architecture 100 and computing device 300 shown in FIGS. 1 and 3 are provided by way of example only. Numerous other operating environments, system architectures, and device configurations are possible. Accordingly, embodiments of the present disclosure should not be construed as being limited to any particular operating environment, system architecture, or device configuration.

Figure 4:
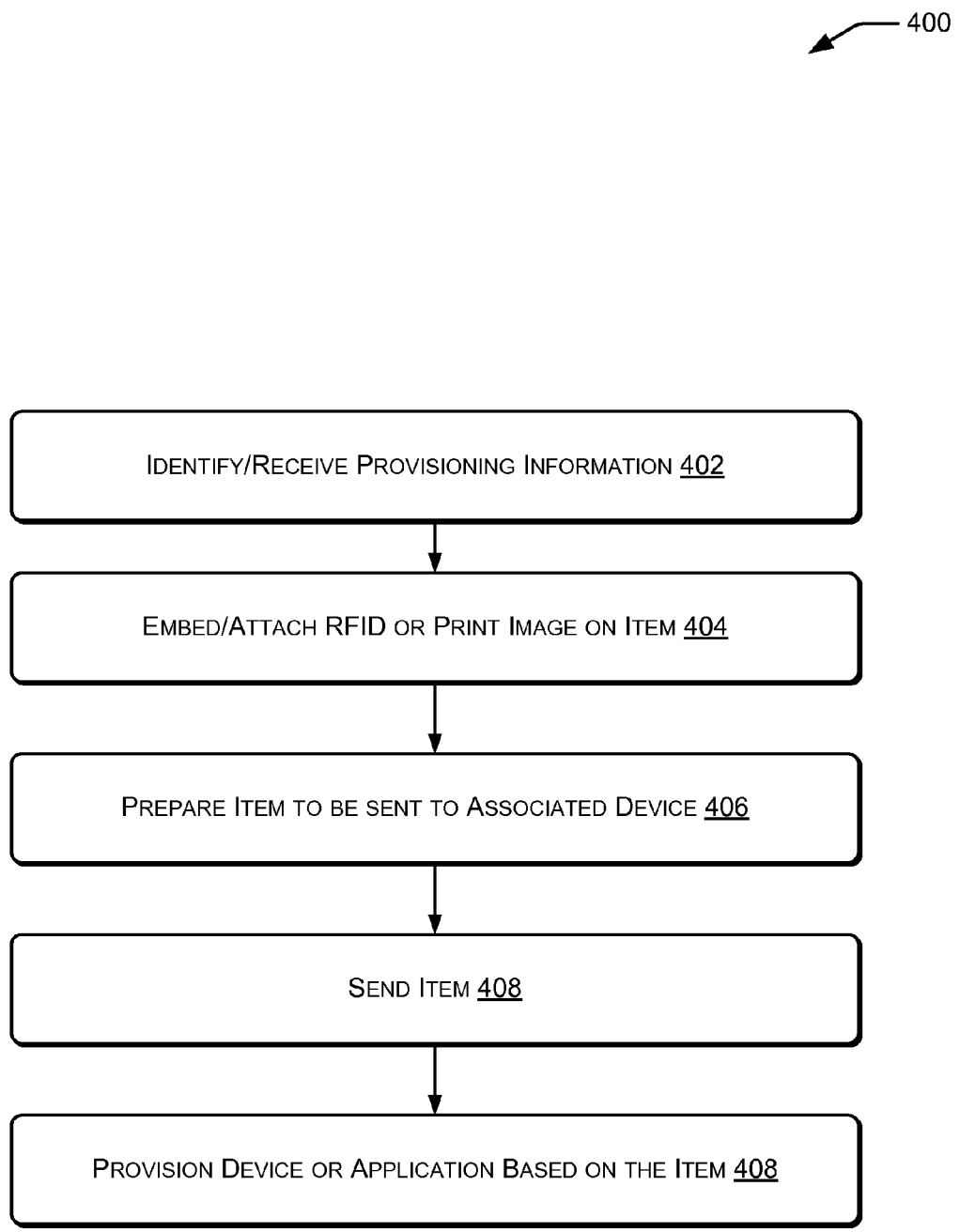
FIG. 4 illustrates a flowchart of an example process for provisioning by delivered items, according to an example embodiment of the invention.

FIG. 4 is a flow diagram of one illustrative method 400 of providing items for provisioning devices and/or applications, according to one embodiment. The method 400 may, but need not necessarily, be implemented using the architecture 100 shown in FIG. 1. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

By way of example only, the method 400 can be performed to facilitate the provisioning of any mobile device or application, such as an application that facilitates the encryption of messages and/or communications and/or an NFC payment application provided by a payment service provider (e.g., card account issuer, financial institution, etc.). A mobile device user may request the installation of a desired application on an associated mobile device from either the TSM or directly from a service provider providing the NFC payment application. The TSM computer may perform the necessary steps to prepare the end user's mobile device and associated secure element, either directly and/or via the end user's mobile network operator. In addition, the TSM may perform the various authentication measures to verify the end user, the end user's mobile device, and set up and personalize the requested application for installation on the end user's secure element. After the requested application is personalized and authentication and security measures are in place at the TSM computer, the application may be provisioned to the end user's mobile device. After provisioning, the lifecycle of the application for that end user may be managed via the TSM computer. Various services can be provided and/or otherwise facilitated by the TSM computer, such as handling service requests from the end user and/or a service provider; facilitating updates to the application; and any other communications that may be requested between the service provider, the end user's mobile device, and/or the end user. It is appreciated that this description of provisioning and servicing an application is provided for illustrative purposes, and the methods described with reference to FIG. 4 may be performed for any type of mobile device application between any of a number of parties, and in any order.

The method 400 may begin at block 402 in which the method 400 may identify and/or receive provisioning information associated a particular device, an application stored on a device, or an application requested or desired to be stored on a device. At block 404, the method 400 may embed or otherwise attach an RFID tag, a bar code, or an image to an item. The item may be a physical or digital statement, bill, notification, invitation, or other document to be sent to an end-user of the device. The method may then, at block 406, prepare the item to be sent to the associated device. Preparation may include encoding, forwarding, and/or otherwise making the document available to be shipped or digitally transmitted. At block 408, the method 400 may send the item by transmitting the item over a network or providing the item to a mail courier. Finally, at block 408, the method 400 may allow for provisioning of the device or application based on the sent item. In certain aspects, the method 400 may wait for the device to contact the TSM or application issuer prior to provisioning.

Although the invention has been described in language specific to structural features and/or methodological acts, it is to be understood that the invention is not limited to the specific features or acts described. Rather, the specific features and acts are disclosed as illustrative forms of implementing the invention.

The claimed invention is:
1. A method comprising:
   identifying, from a computer-readable memory, provisioning information associated with a specific device;
   attaching the provisioning information to a physical item; and preparing the physical item to be delivered to a location associated with the device,
wherein the device is provisioned with a first application based at least in part on the provisioning information attached to the physical item, and
provisioning the device comprises:
registering the device with a service provider that provides ongoing functionality to the device,
initiating communication between the device and the service provider; and
initiating installation of a second application on the one or more computer readable memories of the device.

2. The method of claim 1, wherein identifying the provisioning information comprises receiving the provisioning information from a provider of the device.

3. The method of claim 1, wherein identifying the provisioning information comprises receiving the provisioning information from a provider of a service for the device.

4. The method of claim 1, wherein the physical item comprises a statement or a bill for the device or a service associated with the device.

5. The method of claim 4, wherein attaching the provisioning information comprises embedding a radio frequency identification (RFID) tag into the statement or the bill, or attaching an RFID tag to the statement or the bill.

6. The method of claim 5, wherein the provisioning is triggered based at least in part on one or more of contacting the RFID, identifying the RFID, or receiving a signal from the RFID.

7. The method of claim 4, wherein attaching the provisioning information to the physical item comprises printing a bar code or an image onto the statement or the bill, or attaching the bar code or the image onto the statement or the bill.

8. The method of claim 7, wherein the provisioning is triggered based at least in part on scanning or capturing the bar code or the image.

9. The method of claim 1, wherein preparing the physical item to be delivered to the location associated with the device comprises packaging the physical item and mailing the physical item to a user of the device.

10. The method of claim 1, wherein preparing the physical item to be delivered to the location associated with device comprises packaging the physical item.

11. A method comprising:
storing, in one or more computer-readable memories of a device, a first application for processing one or more provisioning triggers;
receiving, by an end user from a service provider, a physical item that contains a provisioning trigger;
processing the provisioning trigger via the first application;
initiating communication between the device and the service provider based at least in part on the provisioning trigger;
initiating installation of a second application on the one or more computer-readable memories of the device based at least in part on the provisioning trigger; and
provisioning the second application of the device with the service provider based at least in part on the provisioning trigger, such that the second application is configured to facilitate an ongoing service provided by the service provider, wherein provisioning the second application includes hardware information associated with the device.

12. A system comprising:
at least one memory having encoded thereon computer-executable instructions; and
at least one processor configured to access the at least one memory and execute the computer-executable instructions to:
identify, from a computer-readable memory, provisioning information associated with hardware of a device;
attach the provisioning information to a physical item; and
prepare the physical item for delivery to a location associated with the device hardware,
wherein the device is provisioned with a service provider based at least in part on the provisioning information attached to the item, and
provisioning the device comprises:
registering the device with the service provider, the service provider providing ongoing functionality to the device,
initiating communication between the device and the service provider; and
initiating installation of a second application on the one or more computer readable memories of the device,
such that the device is configured to facilitate a service from the service provider that provides ongoing functionality to the device.

13. The system of claim 12, wherein the computer-executable instructions to identify the provisioning information comprise instructions to receive the provisioning information from a provider of the device.

14. The system of claim 12, wherein the computer-executable instructions to identify the provisioning information comprise instructions to receive the provisioning information from a provider of a service for the device.

15. The system of claim 12, wherein the physical item comprises a statement or bill for the device or a service associated with the device.

16. The system of claim 15, wherein the computer-executable instructions to attach the provisioning information comprise instructions to embed a radio frequency identification (RFID) tag into the statement or bill, or attaching an RFID tag to the statement or bill.

17. The system of claim 16, wherein the device is provisioned at least in response to contacting the RFID, identifying the RFID, or receiving a signal from the RFID.

18. The system of claim 15, wherein the computer-executable instructions to attach the provisioning information comprise instructions to print a bar code or image onto the statement or bill, or attaching a bar code or image onto the statement or bill.

19. The system of claim 18, wherein the device is provisioned at least in part to scanning or capturing the bar code or image.

20. The system of claim 12, wherein the computer-executable instructions to prepare the physical item to be delivered to the location associated with device comprises either instructions to package the physical item and mail the physical item to a user of the device; or instructions to package the physical item.

* * * * *